Figure 1:
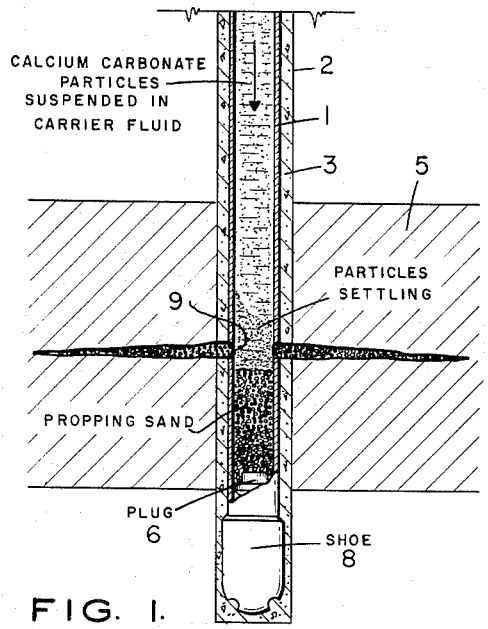
Figure 2:
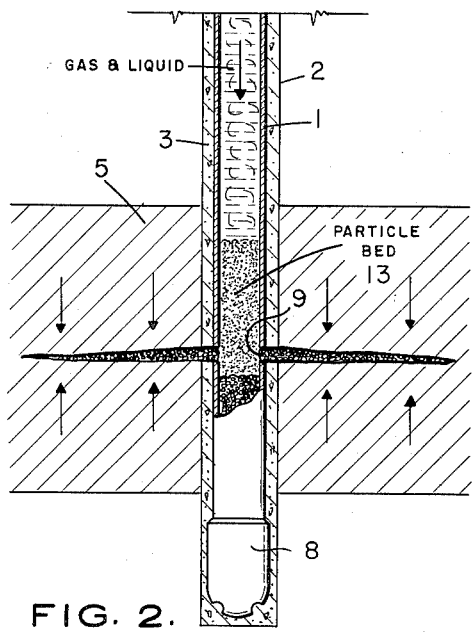

INVENTORS.
HORACE H. SPAIN,
JOHN W. KENNEDAY,
BY  OTTO R. HARRISON,
CLEVELAND DEAR JR.,

John B Davidson

ATTORNEY.

3,233,673
FRACTURING FORMATIONS IN WELLS
Horace H. Spain, Houston, John W. Kenneday, Corpus Christi, Otto R. Harrison, Kingsville, and Cleveland Dear, Jr., Houston, Tex., assignors, by mesne assignments, to Esso Production Research Company, Houston, Tex., a corporation of Delaware
Filed Dec. 9, 1963, Ser. No. 329,009
7 Claims. (Cl. 166—42)

This invention relates generally to stimulation of productivity of earth fluids by the fracturing technique, and more particularly to the prevention of flow-back of fracture propping agents into a well bore.

The technique of stimulating production of earth fluids, such as oil and gas, from subsurface earth formations by the fracturing process is well known. In this process a liquid or gelled fluid is introduced into a well penetrating a formation to be fractured, and the liquid or gelled fluid is subjected to a pressure high enough to effect formation fracturing. Various special property fracturing fluids have been developed for use in connection with this technique. The fluids are adapted to carry in suspension particulate propping agents such as sand, aluminum spheres, polypropylene pellets, hardened epoxy resin pellets, and other agents of sufficiently small size to be carried into the extremities of a fracture, and at the same time having sufficient compressional strength to support the fracture after pressure is released from the fracturing fluid.

When the fracture or crevice is opened, the fracturing fluid bearing the particulate propping agent is forced back into the fracture, and the propping agent fills the space thus opened. After a period of time the fluid is removed from the fracture, leaving the propping agent in the fracture to prop it open and permit the easy flow of oil and gas.

It has been found that not infrequently the fracture propping agent flows back into the well bore before the hydraulically induced fracture closes on the propping agent particles to hold them in place. When such flowback of the propping agent occurs, the well bore tends to become plugged, necessitating an expensive cleanout operation. In addition, the loss of propping agent from the fracture means that less well stimulation is accomplished than would otherwise have been attained.

In accordance with the teachings of the present invention, the fracturing fluid and particulate propping agent is followed into the well bore by a mixture of a carrier liquid having admixed therewith a particulate material, preferably an alkaline earth carbonate, having particle sizes between 4 and 40 mesh. The quantity of particulate material in the carrier fluid when settled is sufficient to fill the well bore to above the level of the fracture. The carrier fluid and particulate material mixture is forced into the well bore until the fracturing fluid is completely forced into the fracture. The particulate material is allowed to settle into the well bore to prevent flowback of propping agent.

In a preferred aspect of the invention, the carrier fluid and particulate material is followed into the well bore by a fluid incapable of penetrating the particulate material, and pressure is maintained in the well bore until the fractured earth formation has stabilized. Thereafter, when the particulate material comprises an alkaline earth carbonate, the particulate material is contacted with an acid that forms alkaline earth salts soluble in water. Fluids are thereafter circulated out of the well bore and the well is placed in production.

Objects and features of the invention not apparent from the above discussion will become evident upon consideration of the following detailed description of the invention taken in connection with the accompanying drawing, wherein:

FIGS. 1 through 4 are schematic cross-sectional diagrams of a portion of a well bore and surrounding earth formations, illustrating various steps in accordance with the teachings of the invention.

With reference now to FIGS. 1 through 4, there is illustrated a productive earth formation 5 penetrated by a well bore 2. In accordance with usual practice, a casing string 1 lines the well bore and is bonded to the sides of the well bore by a cement sheath 3. For the purpose of opening fluid communication between the productive earth formation 5 and the casing bore, the well has been previously perforated to form at least one, and preferably more, perforations 9.

When the productive earth formation 5 is at or near the bottom of the well bore, the lower end of the casing string may be closed by the usual cementing shoe 8. However, when the formation 5 is at a level substantially above the bottom of the well bore, a bridge plug 6 may be placed at a desired level below perforations 9. Alternatively, the entire lower end of the casing string may be filled with cement.

When it becomes desirable to fracture the formation, a mixture of fracturing fluid and particulate propping material is formed at the earth's surface. Any fracturing fluid that has been customarily used in the past may be used in accordance with the present invention. Desired properties of a fracturing fluid are: (1) it must be sufficiently fluid to be easily pumped by conventional pumping equipment; (2) it must readily flow into the hydraulically formed fracture with a minimum of fluid loss into the fractured earth formation; (3) it must hold in suspension the propping material while being pumped down the well and into the formation; and (4) it must not permanently plug the pores of the fractured formation. Examples of suitable fracturing materials are a liquid petroleum fraction containing a bodying agent such as a metallic salt of an organic acid. Another suitable fracturing fluid is described in U.S. Patent 3,065,171, and comprises a hydrocarbon carrier fluid along with calcium acetate-calcium soap complexes formed by heating to a temperature of at least 400° F. a mixture of a high molecular weight carboxylic acid (such as stearic acid), acetic acid, and hydrated lime in a naphthenic-type mineral oil, said complexes being present in the range of from .0005 to 1.5% by weight of the fracturing fluid.

As indicated above, the particulate propping agent may be sand, aluminum spheres, polypropylene pellets, or hardened epoxy resin pellets or other suitable propping agents known to the art. In accordance with prior art techniques, when sand is used it is preferable that it be specially graded sand which is of uniform grain size and with grains uniformly round.

Also formed at the earth's surface is a mixture of a carrier liquid and a particulate solid material having particle sizes between 4 and 40 mesh. The carrier liquid may be oil or water, and may be thickened by the addition of conventional agents, such as those used to thicken featuring fluids. Preferably, the particulate material is an alkaline earth carbonate, such as calcium carbonate.

Figure 3:
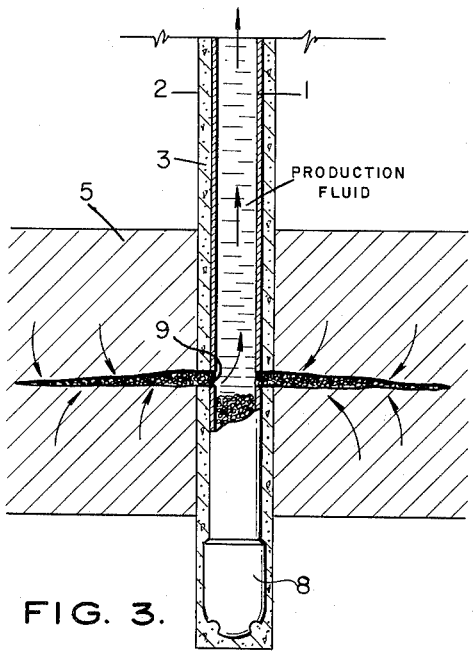

After the mixtures described above have been formed, the amount of fracturing fluid and propping agent calculated to be required for the fracturing job is pumped into the well bore 2 and is followed by the mixture of the carrier fluid and alkaline earth carbonate. Where the amount of fracturing fluid required for the job has been calculated to be greater than the volume of the well bore, manifestly it will be necessary to have suitable valving equipment at the earth's surface to shift from the reservoir wherein is stored the fracturing fluid, to the reservoir wherein is stored the carrier fluid and alkaline earth carbonate. The fluids are pumped into the well bore after the formation has been fractured until the fracturing fluid is completely within the fracture, as shown in FIG. 1. The mixture of carrier fluid and alkaline earth carbonate will have reached the point where the well casing is perforated and preferably should not enter into the fracture. The amount of alkaline earth carbonate in the carrier liquid should be such that when the particles have settled in the well bore into a bed 13, the mass thereof will extend to above the perforations 9. Hydrostatic pressure in the well bore is maintained at least equal to formation pressure until the formation has stabilized both with respect to formation pressure and closure of the formation around the propping particles. It will be found that the pack of calcium carbonate particles in most instances will be sufficient to hold back the particulate propping agent in the fracture until the formation has stablized so that the formation itself will hold the propping agent in the fracture. It may be possible thereafter to produce the formation 5 through the bed 13 of alkaline earth carbonate material. However, its is preferred to contact the alkaline earth carbonate material with an acid that forms alkaline earth soluble in water, such as hydrochloric acid, formic acid, or acetic acid. This may be done by circulating the acid down a tubing string in the well bore. When the well bore is free of alkaline earth carbonate material, the well is placed in production, as shown in FIG. 3.

The invention as described above is adequate in most instances to prevent flow-back into a well bore of fracture propping agents. However, it has been found that some earth formations are rather plastic in behavior and tend to extrude the propping agent, and in some cases some of the formation material, into the well bore after having been deformed by the hydraulic pressure applied to create a fracture. To prevent flow-back of propping agent and formation materials from such formations, a third fluid mixture is compounded at the earth's surface. This fluitd is of such a nature that it will not penetrate the alkaline earth carbonate material to a depth of more than a few inches after the particulate alkaline earth carbonate material has settled into the bottom of the well bore. The nonpenetrating fluid is preferably an emulsion containing solid particles varying from 4 mesh to 325 mesh. A particular composition that has been found to be quite satisfactory is an emulsion of 2 to 10% of oil in 98 to 90% of water, to which has been added ferrochrome lignosulfonate as a stabilizer in the amount of 2.0 to 5.0% by weight of emulsion. To this emulsion is added between 50 and 150 pounds per 42-gallon barrel of calcium carbonate, of which 85% will pass through a 325 mesh screen and between 80 and 150 pounds per barrel of calcium carbonate having particle sizes throughout the complete particle range of 4 to 200 mesh. More specifically, to the emulsion is added 100 pounds per barrel of calcium carbonate, of which 85% will pass through a 325 mesh screen, 40 pounds per barrel of 40 to 200 mesh calcium carbonate, 20 pounds of 30 to 50 mesh calcium carbonate, 10 pounds of 20 to 40 mesh calcium carbonate, 15 pounds of 10 to 24 mesh calcium carbonate, and 35 pounds of 4 to 10 mesh calcium carbonate. Clay or an organic colloid, such as starch, carboxy methyl cellulose or guar flour, may be added to give a viscosity that will suspend the calcium carbonate particles. Examples of other nonpenertating fluids that may be used are low filtration drilling muds either oil base or water base, water thickened with starch, carboxy methyl cellulose or guar flour, and oil thickened with metal salts of organic acids.

Figure 4:
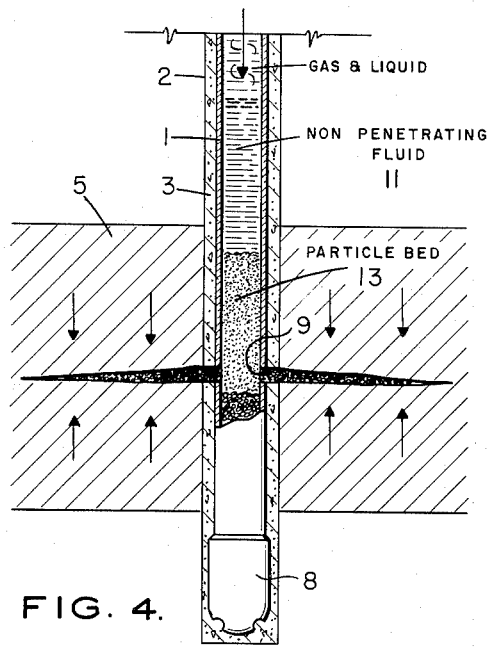

As shown in FIG. 4, the nonpenetrating fluid 11 described immediately above is injected into the well bore after the carrier fluid containing calcium carbonate particles that follows the fracturing fluid. As shown in FIG. 4, the nonpenetrating liquid may be followed by any other liquid or gasiform fluid, such as water, oil, or nitrogen, for maintaining desired pressure in the well bore above hydrostatic pressure. The nonpenetrating fluid enables the application of hydraulic pressure to the bed 13 of alkaline earth carbonate to counteract forces exerted by the earth formation which tend to extrude propping agent and/or formation material into the well bore. The carrier fluid for the carbonate material is forced through the fracture into the formation. After allowing enough time for the formation to stabilize and after the pressure has been released, the nonpenetrating liquid may be circulated out of the well bore by inserting a tubing string into the well bore, and the calcium carbonate pack may be contacted with an acid that forms alkaline earth salts soluble in water. The liquid may be thereupon circulated out of the well bore and the well placed in production following usual techniques.

The effectiveness of the invention becomes readily apparent upon consideration of the results obtained after fracturing jobs on two wells completed in very similar formations in the Gulf Coast of Texas. Each of the wells was hydraulically fractured, and 80 to 120 mesh fracturing sand was injected into the fracture as a propping agent. One of the well treatments was conventional, no measures being taken to prevent flow-back of the propping agent. The other treatment incorporated the present invention making use of the technique illustrated in FIG. 2 inasmuch as the formation was expected to act elastically. The fluid containing the propping agent was followed by diesel fuel containing 20 to 40 mesh calcium carbonate particles which were allowed to settle into the perforated interval. The diesel fuel was followed by 6 barrels of an emulsion made from water and kerosene and containing calcium carbonate in a complete range of particle sizes from 20 through 325 mesh. Hydraulic pressure was kept on the well for 3 hours after the fracturing operation was complete. In the well in which the invention was not employed, enough sand and/or formation material re-entered the well bore to fill the casing to a point 1000 feet above the perforations through which the formation was fractured. In the well in which the invention was employed, no material re-entered the well.

The invention is not to be restricted to the specific structural details or arrangement of parts herein set forth, as various modifications thereof may be effected without departing from the spirit and scope of the invention.

The objects and features of the invention having been completely described, what we wish to claim is:

1. In a method of treating a formation to increase production of earth fluids from a hydrocarbon productive earth formation wherein the formation is fractured by pumping at fracturing pressure through a well bore and into the formation a fracturing fluid having admixed therewith a particulate propping agent, the improvement comprising:

following the fracturing fluid, injecting into the well bore a carrier liquid having admixed therewith particulate alkaline earth carbonate material having particle sizes between 4 and 40 mesh and sufficient in quantity to fill the well bore to above the fracture when settled;

maintaining hydraulic pressure in the well bore at least equal to the formation pressure until the fractured formation has stabilized both with respect to formation pressure and closure of the formation around the propping particles; and after the formation has stabilized, contacting said alkaline earth carbonate material with an acid that forms alkaline earth salts soluble in water.

2. In a method of treating a formation to increase production of earth fluids from a hydrocarbon productive earth formation wherein the formation is fractured by pumping at fracturing pressure through a well bore and into the formation a fracturing fluid having admixed therewith a particulate propping agent, the improvement comprising:

following the fracturing fluid, injecting into the well bore a carrier liquid having admixed therewith particulate alkaline earth carbonate material having particle sizes between 4 and 40 mesh and sufficient in quantity to fill the well bore to above the fracture when settled; maintaining hydraulic pressure in the well bore at least equal to the formation pressure until the fractured formation has stabilized both with respect to formation pressure and closure of the formation around the propping articles.

3. The method of claim 2 wherein the alkaline earth carbonate material is calcium carbonate.

4. In a method of treating a formation to increase production of earth fluids from a hydrocarbon productive earth formation wherein the formation is fractured by pumping at fracturing pressure through a well bore and into the formation a fracturing fluid having admixed therewith a particulate propping agent, the improvement comprising:

following the fracturing fluid, injecting into the well bore a carrier liquid having admixed therewith particulate alkaline earth carbonate material having particle sizes between 4 and 40 mesh and sufficient in quantity to fill the well bore to above the fracture when settled;

following injection of the carrier liquid-particulate alkaline earth carbonate mixture into the well bore, injecting into the well bore a liquid substantially incapable of penetrating settled particulate alkaline earth carbonate comprising an oil-in-water emulsion containing 50 to 150 pounds per barrel of alkaline earth carbonate, 85% of which will pass through a 325 mesh screen and having suspended therein between 80 and 150 pounds per barrel of alkaline earth carbonate material having particle sizes throughout the complete range of 4 to 200 mesh;

maintaining hydraulic pressure in the well bore at least equal to the formation pressure until the fractured formation has stabilized both with respect to formation pressure and closure of the formation around the propping particles;

contacting the alkaline earth carbonate material in the well bore with an acid that forms alkaline earth salts soluble in water; and circulating injected liquids out of the well bore.

5. In a method of treating a formation to increase production of earth fluids from a hydrocarbon productive earth formation wherein the formation is fractured by pumping at fracturing pressure through a well bore and into the formation a fracturing fluid having admixed therewith a particulate propping agent, the improvement comprising:

following the fracturing fluid, injecting into the well bore a carrier liquid having admixed therewith particulate alkaline earth carbonate material having particle sizes between 4 and 40 mesh and sufficient in quantity to fill the well bore to above the fracture when settled;

following injection of the carrier liquid-particulate alkaline earth carbonate mixture into the well bore, injecting into the well bore a liquid substantially incapable of penetrating settled particulate alkaline earth carbonate comprising an oil-in-water emulsion containing 50 to 150 pounds per barrel of alkaline earth carbonate, 85% of which will pass through a 325 mesh screen and having suspended therein between 80 and 150 pounds per barrel of alkaline earth carbonate material having particle sizes throughout the complete range of 4 to 200 mesh; and maintaining hydraulic pressure in the well bore at least equal to the formation pressure until the fractured formation has stabilized both with respect to formation pressure and closure of the formation around the propping particles.

6. In a method of treating a formation to increase production of earth fluids from a hydrocarbon productive earth formation wherein the formation is fractured by pumping at fracturing pressure through a well bore and into the formation a fracturing fluid having admixed therewith a particulate propping agent, the improvement comprising:

following the fracturing fluid, injecting into the well bore a carrier liquid having admixed therewith particulate alkaline earth carbonate material having particle sizes between 4 and 40 mesh and sufficient in quantity to fill the well bore to above the fracture when settled;

following injection of the carrier liquid-particulate alkaline earth carbonate mixture into the well bore, injecting into the well bore a liquid substantially incapable of penetrating settled particulate alkaline earth carbonate;

maintaining hydraulic pressure in the well bore at least equal to the formation pressure until the fractured formation has stabilized both with respect to formation pressure and closure of the formation around the propping particles;

contacting the alkaline earth carbonate material in the well bore with an acid that forms alkaline earth salts soluble in water; and circulating injected liquids out of the well bore.

7. In a method of treating a formation to increase production of earth fluids from a hydrocarbon productive earth formation wherein the formation is fractured by pumping at fracturing pressure through a well bore and into the formation a fracturing fluid having admixed therewith a particulate propping agent, the improvement comprising:

following the fracturing fluid, injecting into the well bore a carrier liquid having admixed therewith particulate alkaline earth carbonate material having particle sizes between 4 and 40 mesh and sufficient in quantity to fill the well bore to above the fracture when settled;

following injection of the carrier liquid-particulate alkaline earth carbonate mixture into the well bore, injecting into the well bore a liquid substantially incapable of penetrating settled particulate alkaline earth carbonate; and maintaining hydraulic pressure in the well bore at least equal to the formation pressure until the fractured formation has stabilized both with respect to formation pressure and closure to the formation around the propping particles.

References Cited by the Examiner

UNITED STATES PATENTS

| | | | |
|---|---|---|---|
| 2,869,643 | 1/1959 | Schuessler et al. | 166—42.1 |
| 3,046,222 | 7/1962 | Phansalkar et al. | 166—42.1 X |
| 3,065,171 | 11/1962 | Morrow et al. | 166—42.1 X |
| 3,149,673 | 9/1964 | Pennington | 166—42.1 |

CHARLES E. O'CONNELL, *Primary Examiner.*